United States Patent
Morgan et al.

(10) Patent No.: US 12,132,630 B2
(45) Date of Patent: Oct. 29, 2024

(54) SYSTEM AND METHOD TO ESTIMATE A LATENCY COST OF RELOCATING A SOFTWARE SERVICE

(71) Applicant: STRIPE, INC., South San Francisco, CA (US)

(72) Inventors: Ray Morgan, San Francisco, CA (US); Alessandro Catorcini, Bellevue, WA (US); Isaac Diamond, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 345 days.

(21) Appl. No.: 17/541,114

(22) Filed: Dec. 2, 2021

(65) Prior Publication Data

US 2023/0179499 A1 Jun. 8, 2023

(51) Int. Cl.
*H04L 43/0852* (2022.01)
*H04L 43/0817* (2022.01)
*H04L 67/00* (2022.01)

(52) U.S. Cl.
CPC ...... *H04L 43/0858* (2013.01); *H04L 43/0817* (2013.01); *H04L 67/34* (2013.01)

(58) Field of Classification Search
CPC .. H04L 43/0858; H04L 43/0817; H04L 67/34
See application file for complete search history.

(56) References Cited

U.S. PATENT DOCUMENTS

| 11,438,437 | B1* | 9/2022 | Eberlein | G06N 5/04 |
| 2019/0356530 | A1* | 11/2019 | Berg | H04L 67/1031 |
| 2023/0169528 | A1* | 6/2023 | Eberlein | H04L 41/0893 705/7.34 |
| 2023/0171244 | A1* | 6/2023 | Peddada | H04L 9/3247 726/7 |

* cited by examiner

*Primary Examiner* — Yemane Mesfin
*Assistant Examiner* — Salma Ayad
(74) *Attorney, Agent, or Firm* — Foley & Lardner LLP

(57) ABSTRACT

A method and system for performing a movement of a service within a distributed system. In one embodiment, the method comprises determining one or more locations where the service is to be moved. The method further comprises for each of the one or more locations, computing a metric including a cross-cell cost (C-cost) or a data locality-cost (DL-cost) of the software service if a movement of the software service to a location was to occur, prior to performing the movement of the software service; and modelling a latency and availability of the system due to the movement of the software service to the location based on the metric. The method further comprises performing the movement of the service based on the modelled latency and availability of the system.

24 Claims, 6 Drawing Sheets

SYSTEM AND METHOD TO ESTIMATE A LATENCY COST OF RELOCATING A SOFTWARE SERVICE

FIELD

Embodiments of the present disclosure relate to the field of systems for software service; more particularly, embodiments of the present disclosure relate to estimating a latency cost of relocating a software service.

BACKGROUND

Software services play a critical role in modern society. Software services failure may cause devastating disruption of business operations and severe economic loss. With the development of technology and economy worldwide, a software service in a distributed system may need to be relocated to a different geographical location. There may be a latency cost associated with the relocation of the service. The latency cost due to the relocation of the service may result in instability of the distributed system, or a software service failure due to time-out errors.

Currently, the latency cost due to the relocation of the service is measured after the relocation of the service. The relocation of the service may not be optimized due to the latency cost. Further, when the latency cost of the relocation of the service is too large, the distributed system may not be able to operate in an optimized manner or be unstable, or the software service may fail.

SUMMARY

A method and system for performing a movement of a service within a distributed system. In one embodiment, the method comprises determining one or more locations where the service is to be moved. The method further comprises for each of the one or more locations, computing a metric including a cross-cell cost (C-cost) or a data locality-cost (DL-cost) of the software service if a movement of the software service to a location was to occur, prior to performing the movement of the software service; and modelling a latency and availability of the system due to the movement of the software service to the location based on the metric. The method further comprises performing the movement of the service based on the modelled latency and availability of the system.

BRIEF DESCRIPTION OF THE DRAWINGS

The present disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
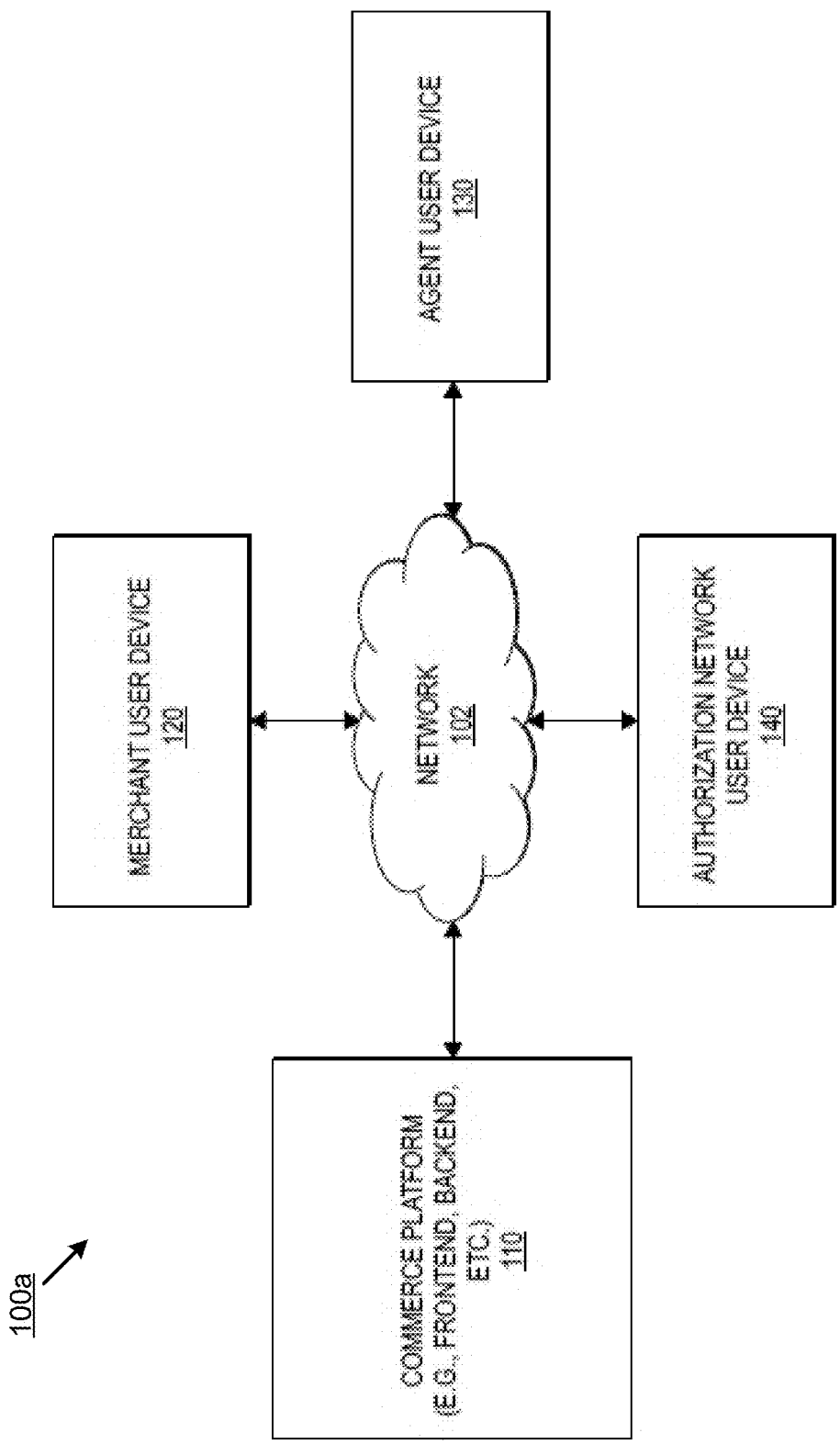
FIG. 1A is a block diagram of an example of a system for a commerce platform.

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

Techniques are disclosed herein for estimating a latency cost of moving/relocating a software service. A method and system to estimate the effect of movement/relocation of software service(s) in a constellation of services in a distributed system, e.g., a global distributed system, is provided herein. The method and system provides an accurate estimation of the effect on the latency cost of the service(s) resulted from the movement/relocation of the service(s) to different geographic location(s). A metric that indicates a correlation between the effect of the increasing latency due to the relocation of the service(s) to different geographic location(s) may be computed. Based on the computed metric, the effect of the relocation of software service(s) may be estimated prior the actual movement of the software service(s). It is advantageous to accurately estimating the latency cost of the movement/relocation of software service(s) before the actual movement/relocation of the software service(s). The movement/relocation of software service(s) may be improved, and potentially optimized, according to the estimated latency cost. For example, a location of every service may be optimized for the maximum performance of the global system. In unconstrained optimization, the optimal placement of every service may be determined to reduce, and potentially minimize, the latency and response times. When some software service(s) are constrained on where the service(s) can be relocated, the effect of the movement of the service(s) on the performance of the overall distributed system may be determined, and the systems may be adjusted, modified, or reinforced. The collection of the data and the computing of the metric as well as the determination of the associated correlations may be too difficult and too time consuming to be performed manually. There may be a need to develop a method and a system to automatically computing the metric and estimating the effect of the relocation of software service(s) prior the actual movement of the software service(s).

Software services or merchant data may be classified into different categories. Each category of software services or merchant data may be sliced into different cells, which refer to different groups in different geographic regions. A cell may refer to a homogenous set of services performing one or more functions located in proximity of each another. The cell may include a set of co-located services or applications and the data that the set of co-located services or applications consume. The term "cell pinning" may refer to assigning a service or an application to a cell. In each cell, software services or merchant data are running geographically close to each other. When the software services are removed or relocated across the region from a cell to another cell, an increased latency and response time may occur, resulting in an impact or effect in the performance of the system. A metric that directly correlates the increased latency and response time may be computed to estimate the impact or effect of the movement or relocation to the performance of the system. For example, the metric may take into account a cross-cell cost (C-cost). The c-cost indicates the number of times the cell boundaries are crossed (e.g., when reading from or writing data to an application). For example, for every service that is on the call path to fulfill a request, every read or write to data within a different cell adds 1 to the C-cost. The C-cost may indicate the impact or effect of the movement or relocation to the performance of the system at a service level. The metric may also include data locality cost (DL-cost) under data locality constraints. Some data may only be stored or shared in certain regions. The DL-cost includes a cost due to a movement of the service to different localities.

FIG. 1A is a block diagram of an example of a system 100a for a commerce platform. In one embodiment, system 100a includes a commerce platform 110, a merchant user device 120, an agent user device 130, and an authorization network user device 140. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In one embodiment, one or more of the commerce platform 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides software service, e.g., financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

Figure 1B:
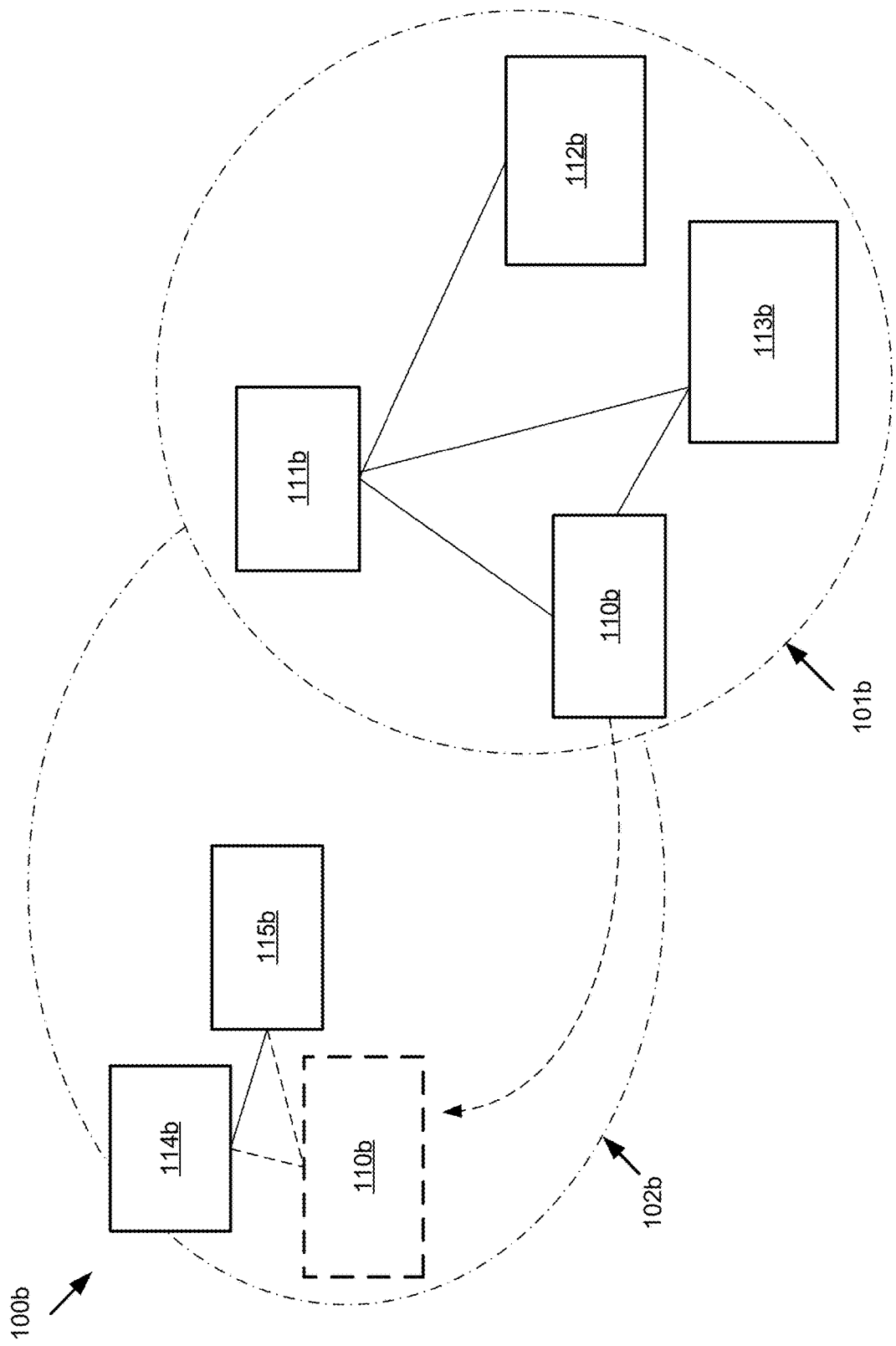
FIG. 1B is a block diagram illustrating relocating a software service in a distributed system.

FIG. 1B is a block diagram illustrating relocating a software service in a distributed system 100b, e.g., a global distributed system. The distributed system 100b may include multiple software components that are on multiple computers, but run as a single system. The computers (e.g., 110b, 111b, 112b, 113b) that are in the distributed system may be geographically close together and connected by a local network, or may be geographically distant and connected by a wide area network. The distributed system 100b may be a system whose components are located on different networked computers, which communicate and coordinate their actions by passing messages to one another. With the development of technology and economy worldwide, one or more software services (e.g., 110b) in a distributed system may need to be relocated to one or more different geographical locations. When the one or more software services (e.g., 110h) are to be moved into a new geographic location, e.g., on the other side of the world, there may be an increased latency and response time due to an increased geographical distance and a number of hops. In addition, other software services in the constellation of services in the distributed system may be affected by the relocation, e.g., software services upstream and downstream of the relocated software services may be affected because they, for example, work together, are dependent upon each other, etc.

Estimating the effect of the movement/relocation of software service(s) on the performance of the distributed system before the actual movement/relocation of the software service(s) may enable optimizations of the relocation. For example, a location of every service may be improved, and potentially optimized, for the maximum performance of the global system. In unconstrained optimization, the optimal placement of every service may be determined to minimize the latency and response times. When software services have to be split into different locations, the impact to other part of the overall distributed system may be estimated, and the other part of the overall distributed system may be adjusted to minimize the effect of the movement or relocation of the services. For example, when some software service(s) are constrained on where the service(s) can be relocated, the effect of the movement of the service(s) on the performance of the overall distributed system may be determined, and the systems may be adjusted based on the computed C-cost, which plays an important role in implementing high availability disaster recovery (HADR) of the system.

As discussed above, software services or merchant data may be classified into different categories. Each category of software services or merchant data may be sliced into different cells, which refer to different groups in different geographic regions. The term "cell" may refer to a homogenous set of services performing one or more functions located in proximity of each another. The cell may include a set of co-located services or applications and the data which the set of co-located services or applications consume. The term "cell pinning" may refer to assigning a service or an application to a cell. In each cell, software services or merchant data are running geographically close to each other. Each cell may have its own characteristics and properties. The software services may be split into different cells according to geographical locations. A software service or an application may be pinned to a cell based on its geographic location. For example, as illustrated in FIG. 1B, a distributed system 100b may include software services 110b, 111, 112b, 113b, 114b, 115, etc. The services 110b, 111, 112b and 113b may be located within the cell 101b, and services 114b and 115b may be is located within the cell 102b. The cell 101b and the cell 102b may be in different geographical location.

When the software services are removed or relocated across the region from a cell to another cell, an increased latency and response time may occur, resulting in an impact or effect in the performance of the system 100b. For example, as illustrated in FIG. 1B, the service 110b may be moved from the cell 102b to the cell 101b, then the increased latency and response time may occur. A metric that directly correlates to the increased latency and response time may be computed to estimate the impact or effect of the movement or relocation to the performance of the system. For example, the metric may include a cross-cell cost (C-cost). The C-cost may indicate the impact or effect of the movement or relocation to the performance of the system at a service level.

The C-cost indicates the number of times the cell boundaries are crossed (e.g., when reading from or writing data to an application). Each software service may "pin" to a given cell, which is referred to as "cell pinning". Under "cell pinning", the software service may only access data contained in that cell. When moving the service to another cell, the C-cost may be increased. For example, when one service calls another service that is not pinned to the same cell, (e.g., not in the same location), the C-cost may be increased.

The metric may include data locality cost (DL-cost) under data locality constraints. Some data may only be stored or shared in certain regions. The DL-cost includes a cost of latency due to different localities. The DL-cost only counts for the cost due to crossing the boundaries of locality zones. For example, to migrate a software service to India, the software service may be located subject to locality constraints in a set of cells in India. The DL-cost may be increased in the following cases: (1) if an application of a software service is pinned to a cell which is not going to be moved to India (e.g., US merchant), reading from or writing data to the application in another cell which is located in India, the DL-cost will be increased; and (2) if an application of a software service is pinned to a cell which is to be migrated to India (e.g., an IN merchant), reading from or writing data to the application in another cell that will not be migrated to India, the DL-cost will be increased. For example, there may be a new cell created in India that contains all the applications needed in India and the data required. This data may be represented by a shard of the global database that only lives there. The cell which is to be migrated to India may be the new cell created in India.

The metric (C-cost, or DL-cost) may be computed when a service interacting with another service being moved or considered for a move to a different cell or different geographic data locality zone. For example, if services, e.g., charging for India merchant, are to be moved to India, the requests for the services are to be rerouted to India, the services may have a lot of latency because the core service is still in the US. The impact of running the services in multiple locations or regions may be simulated before actually moving the service to the other region. Both the C-cost and the DL-cost may be computed to model the effect on the availability and performance of the system due to the movement/relocation. In this way, the services(s) with a longer latency or response time due to the relocation(s) may be identified, the parts of the overall system that needs to be adjusted, modified and reinforced may be determined. This may be helpful to ensure that the longer response times and the longer latencies would not cause the services to time out and lose functionality. The cascading failure of the system, e.g., computing resources running out, would be prevented. The users would have good experience from uninterrupted services.

The metric (C-cost, or DL-cost) may be computed and how the system would behave after the relocation of the service may be simulated based on an analytical model. The behavior of the service may be validated for the relocation of the service using the analytical model based on the C-cost. For example, each time there is an increment of the C-cost, and a latency may be injected to model the behavior of the system. The injected latency correlates to what the actual latency will be after the movement of the service. The latency at a boundary of two cells may be determined empirically by measuring all of the actual latencies across the two cells.

In this way, the performance of the system may be simulated before the actual movement of the service. For example, if a service is to relocate to India, the latency from India to US is 300 milliseconds. When crossing the cell boundaries 3 times, the C-cost is 3, then the total latency is 900 milliseconds. The system has to be resilient to the 900 milliseconds latency, or the service may have to be relocated to a different cell with less latency.

In one embodiment, it is possible to simulate how applications of the service will behave under data locality constraints using DL-cost. The DL-cost value indicates the number of one way crossing between locality zones when a given computation of the software service incurs after the relocation of the service. For example, assume the service has been relocated, when the given computation of the software service incurs, the number of one way crossing between locality zones may be calculated. For each locality zone violation, e.g., crossing a boundary of a locality zone, a latency may be injected to simulate the performance of the system under data locality constraints. For example, the latency for each locality zone violation may be 200 to 300 milliseconds. As an example, at the application layer, if an application A is calling an application B while the application and the application B are located in different cells/locality zones, a C-cost and/or DL-cost of 1 may incur. Once the metric (C-cost or DL-cost) is computed, the estimate of the latency may be obtained by multiplying the C-cost or DL-cost value by the latency number for the transcontinental call (e.g. 200 milliseconds). This would mean that an application call with a C-cost or DL-cost of 3 would incur in an additional latency of 600 milliseconds compared to an application call with a DL cost of 0.

The latency injection may be enabled on a per-entity identification (ID) or per service basis to model the system behavior. The system may have a lot of services and entity IDs. For each service of the system, a corresponding C-cost or DL-cost may be computed. For each entity ID, a corresponding C-cost or DL-cost may be computed. In this way, the total latency of the system may be modelled. By computing the C-cost or DL-cost of each service, a potential problem in the system may be identified and solved before the actual deployment of the movement of the service(s), thus the cascading failure due to the movement of the service(s) may be prevented. In unconstrained situation, the location of the movement of the services may be selected based on the computed C-cost or DL-cost. In constrained situation, the system may be modified or adjusted based on the computed C-cost or DL-cost, for example, data flow may be split into smaller traffic.

The software services may have different priorities. For the services with higher priorities, the C-cost or DL-cost may have a low threshold. For example, the C-cost or DL-cost for the services with higher priorities may be less than 500 milliseconds, 300 milliseconds, 250 milliseconds, 200 milliseconds, etc. For the services with higher priorities, the C-cost or DL-cost may have a high threshold. For example, the C-cost or DL-cost for the services with higher priorities may be less than 2 seconds, 1.5 seconds, 1 seconds, 0.5 seconds, etc.

Figure 1C:
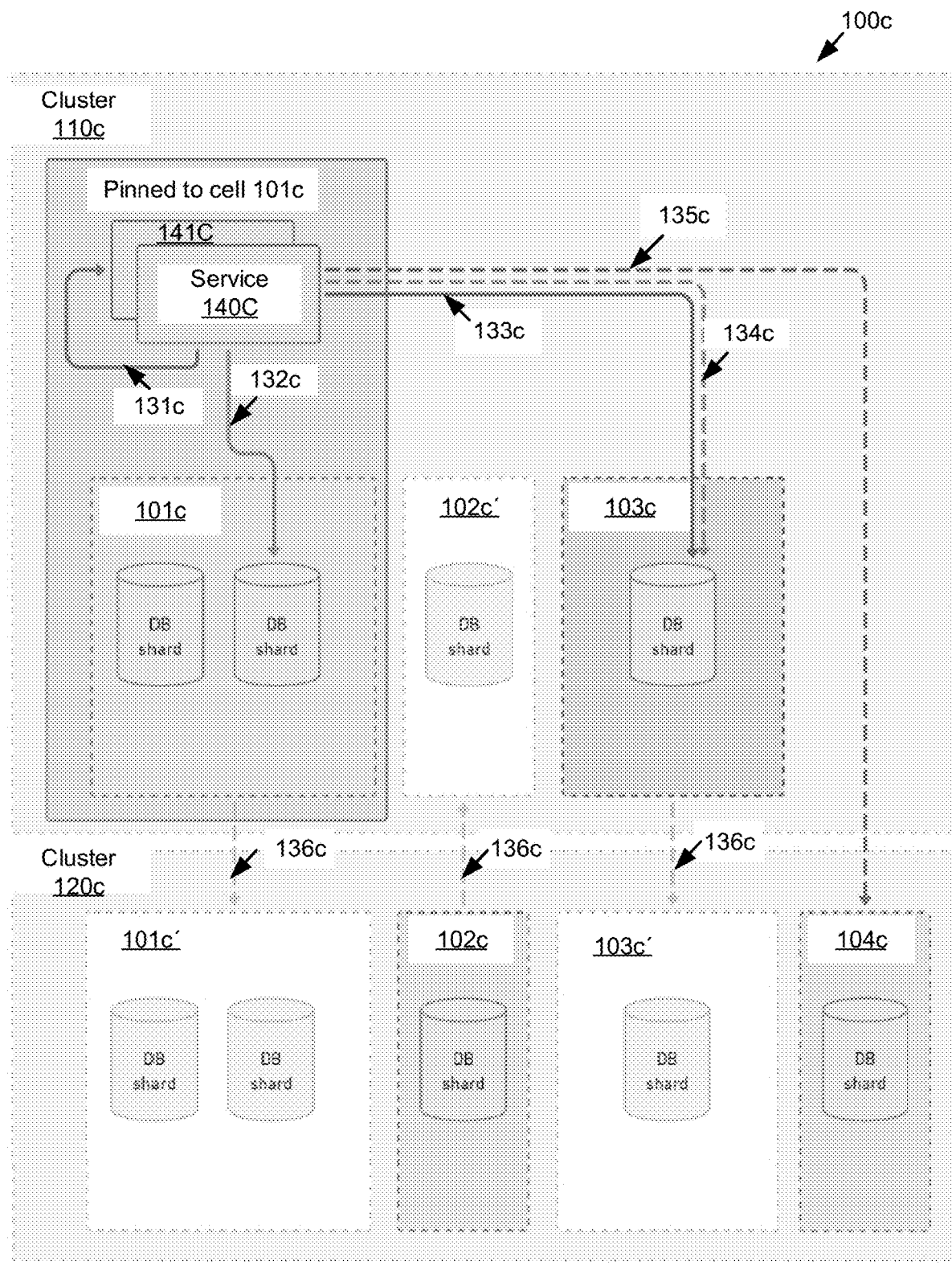
FIG. 1C is a block diagram illustrating of an example of C cost computing.

FIG. 1C is a block diagram 100c illustrating of an example of C-cost computing. For every service that is on a call path to fulfill a request, the C-cost may be computed as follow. For every reading or writing to data within the same cell, the C-cost may be left untouched. For every reading or writing to data to a different cell, the C-cost may be increased by 1. When being computed this way, the C-cost may allow accurately estimating the overall latency of the call by multiplying the total C-cost by the constant latency cost of crossing the cell boundary. Minimizing the C-cost across all the service calls may ensure that the optimal collocation of every service and the latency regarding the collocation of every service can be analytically computed.

Referring to FIG. 1C, the service 140c may be pinned to the cell 101c. The cell 101c may include a set of co-located services or applications (e.g., service 140c) and the data which the set of co-located services or applications consume. The service 140c may be assigned to the cell 101c. A dependent service 141c of the service 140c may also be pinned to the cell 101c. The cell 101c may be included in a cluster 110c. A cluster may include a set of cells deployed in a region. The cluster 110c may include a set of cells deployed in the region. For example, the cluster 110c may include cells 101c, 102c'', 103c, etc. A cell may include one or more shards. A shard may refer to a portion of a database or dataset partitioned according to a given key. As illustrated in FIG. 1C, the cell 101c may include multiple shards.

As illustrated in FIG. 1C, at the call 131c to the dependent service 141c within the same cell 101c from the service 140c, there is no added C-cost. At the call 132c which is consistent reading or writing within the same cell 101c, there is no C-cost incurred. At the call 133c which is consistent reading from or writing to a different cell 103c, the C-cost is increased by +1.

Another cluster 120c may include cells 101c'', 102c, 103c'', 104c, etc. A replica may refer to a quasi-real-time copy of a database or dataset in a different location. For example, cells 101c'', 102c'', 103c'' may be a respective replica for the cell 101c, 102c, 103c. Replication of databases across clusters are illustrated at 136c in FIG. 1C. At the call 134c which is stale replica reading from the cell 103c within the same cluster, the C-cost is not increased because there is no real crossing of the boundary in this scenario. The replica copy is stale but is local (c-cost=0). At the call 135c which is stale replica reading from the cell 104c across the clusters 110c and 102c, the C-cost is increased by +1. For stale replica reading across the clusters, the C-cost is increased by +1. For stale replica reading within the same cluster, the C-cost is not increased.

Figure 2:
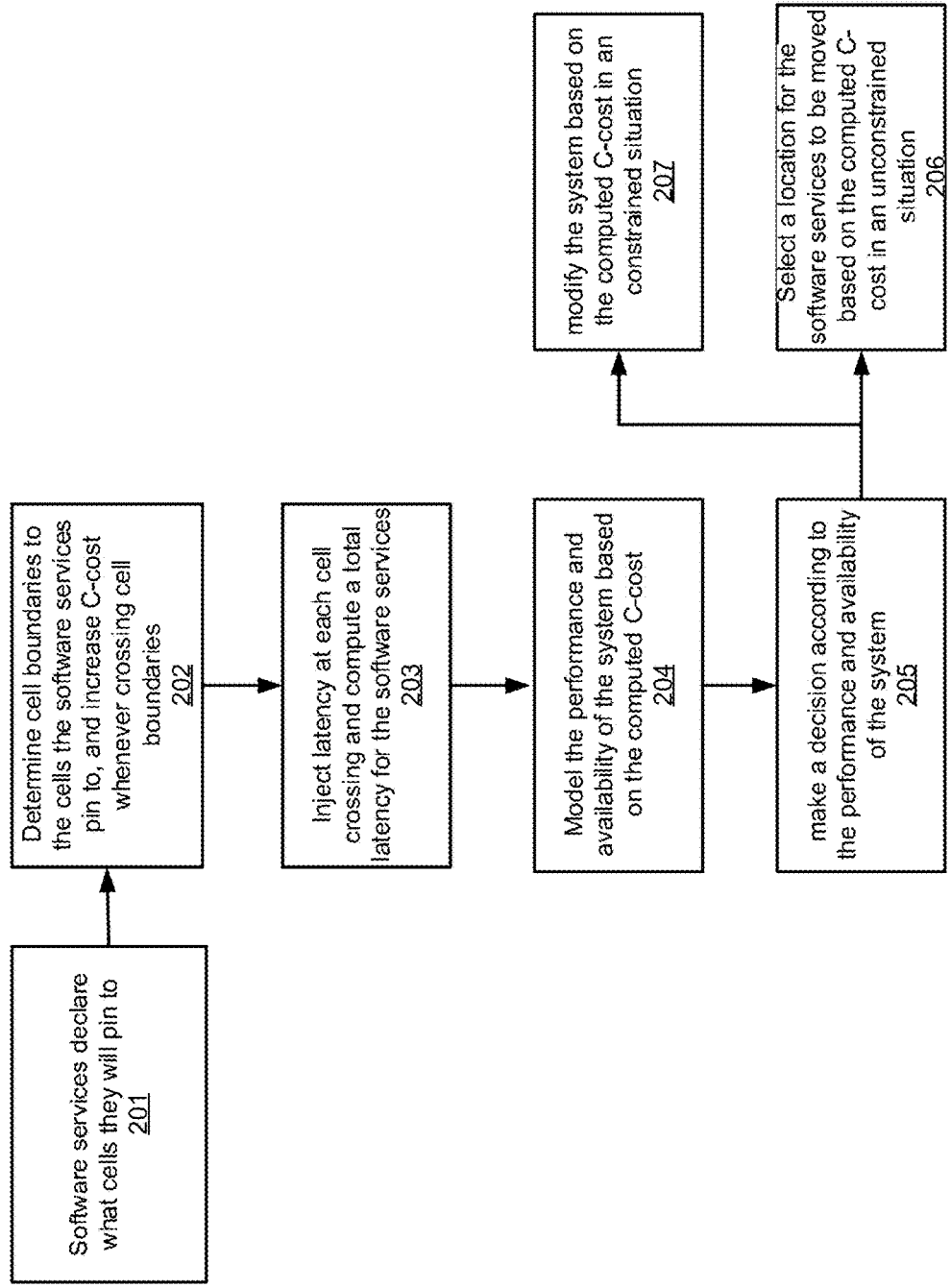
FIG. 2 is a flow diagram of one embodiment of a process for moving software services.

FIG. 2 is a flow diagram of one embodiment of a process for moving software services. Before a movement of software services in a distributed system, a metric correlating to an effect of the movement of the software services to the performance and availability of the system may be estimated. The metric may include a C-cost or DL-cost. By estimating the C-cost or DL-cost, the effect of the movement of the software services to the performance and availability of the system may be predicted. In this way, an optimized location to move the software services may be selected in an unconstrained situation, or the system may be modified, reinforced, or adjusted in a constrained situation. Thus, the cascading failure of the software services or the system may be prevented. The users of the system may enjoy uninterrupted services.

At block 201, the software services to be moved may declare what cells they will be pin to. The software services may be pinned to different cells based on their geographic regions. A modelling of the performance and availability of the system after the movement of the software services may be performed. A model for High Availability (HA) latency, response time and availability may be developed. The model may accurately simulate the performance and availability of the system after the movement of the software services. For example, the model may be external memory model. In this model, all operations (including database accesses, RPCs, etc) within a cluster may be treated as being free, and all inter-cluster messages as a cost of 1 per message. The ideal state for any computation is to be C=0, that is, there are no possible intercluster Requests. The cost of each operation may be cumulative. The C number is directly influenced by access violations (each access violation, e.g., crossing a cell boundary, is an increase in C).

At block 202, cell boundaries of the cells to which the software services are pinned may be determined. The metric C-cost may indicate a number of times when one or more cell boundaries are crossed in a given computation to perform one or more functions of a software service. The C-cost or DL-cost may increase whenever a cell boundary is crossed. For simplicity, DL-cost may be used to estimate the effect of the moving as well. The DL-cost may increase whenever a Locality Zone boundary is crossed.

At block 203, a latency may be injected to each cell crossing. Whenever a cell boundary of two cells is crossed, the latency may be injected. The latency may be determined empirically based on previous data, e.g., from measuring and averaging many previous latencies when crossing the boundary of the two cells. The total latency for the cell boundary may be the C-cost multiplied by the injected latency.

The latency injection may be performed on a per entity ID or per service basis. For each service, a latency may be injected at each cell boundary. For each entity ID, a latency may be injected at each cell boundary. The latency computation may be cumulative. When there are multiple cell boundaries for a software service, the total latency of the software service may be the sum of the latencies of each cell boundary. Where there are multiple software services in the system, the total latency of the software services may be the sum of all the latencies of the software services.

At block 204, the performance and availability of the system after the movement of the software services may be modelled. Based on the C-cost or DL-cost and the injected latency, the performance and availability of the system after the movement of the software services. The modelling can be performed at run time, doesn't need to know the topology of the software services.

At block 205, a decision may be made based on the performance and availability of the system after the movement of the software services. Whether the latency of the software services is within a predetermined threshold may be determined. The latency of the software services with high priorities may have a low predetermined threshold (e.g., 200, 300, 500 milliseconds, etc.) The latency of the software services with low priorities may have a high predetermined threshold (e.g., 1.0, 1.5, 2.0 seconds, etc.) When the latency (latencies) of the software service(s) is/are within the predetermined threshold(s), the system is able to perform its functions after the movement of the software services. Otherwise, the failure of the software services, or upstream, downstream software services, or the system may occur.

At block 206, in an unconstrained situation, when the software services may be moved freely, an optimized location to move the software services may be selected from multiple locations. For example, a location corresponding to the lowest total latency or the best performance of the system may be selected.

At block 207, in a constrained situation, when the software services have to be moved to a certain location (or certain locations), the system may be modified, adjusted, or reinforced. For example, other software services in the system may be moved to lower the overall latency, or software services in the system may be split to make smaller traffic, or the system may be reinforced to be able to tolerate a longer latency.

In this way, the movement of the software services may be potentially optimized, and the failure of the system may be prevented.

Figure 3:
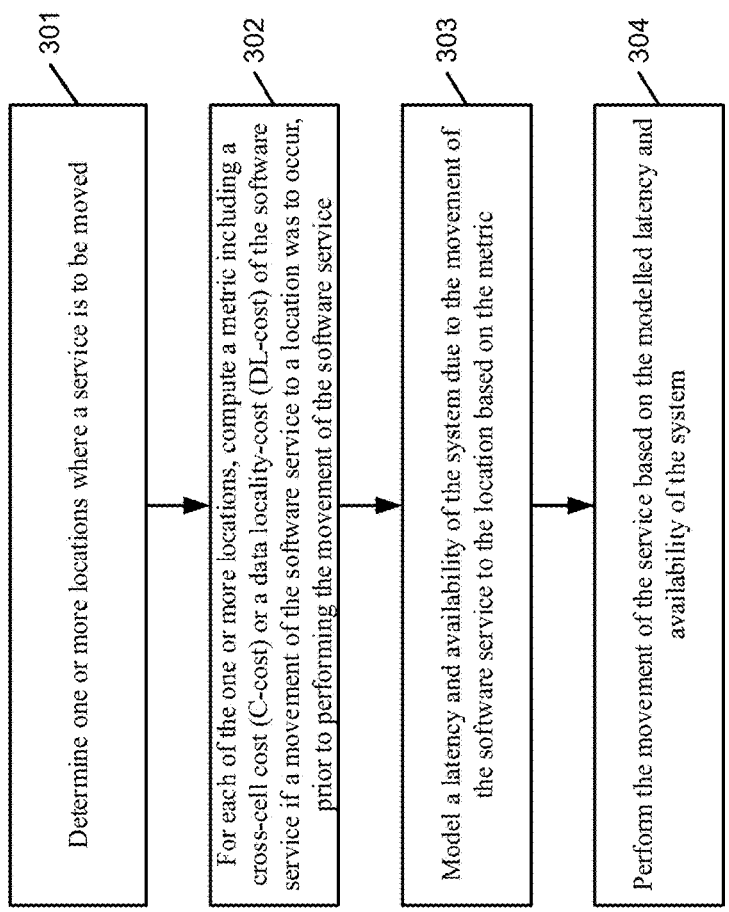
FIG. 3 is a flow diagram of one embodiment of a process for performing a movement of software services.

FIG. 3 is a flow diagram of one embodiment of a process for performing a movement of a software service. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 3, the process begins by determining one or more locations where the service is to be moved by processing logic (processing block 301).

In one embodiment, processing logic determines a cell to which the software service is to be pinned in a location, for each of the one or more locations.

Subsequently, for each of the one or more locations, processing logic computes a metric including a cross-cell cost (C-cost) or a data locality-cost (DL-cost) of the software service if a movement of the software service to a location was to occur, prior to performing the movement of the software service (processing block 302).

In one embodiment, processing logic determines a cell boundary of the cell which the software service is to be pinned.

In one embodiment, processing logic increases the C-cost or DL-cost of the service when the cell boundary is crossed in a computation to perform one or more functions of the software service.

Then, processing logic models a latency and availability of the system due to the movement of the software service to the location based on the metric (processing block 303).

In one embodiment, processing logic performs a latency injection to a computation to perform one or more functions of the software service when the cell boundary is crossed in the computation.

In one embodiment, processing logic computes a total latency of the software service due to the movement of the software service to the location based on the C-cost or DL-cost and the latency injection.

In one embodiment, processing logic models the latency and availability of the system due to the movement of the software service to the location further based on the total latency of the software service.

Finally, processing logic performs the movement of the service based on the modelled latency and availability of the system.

In one embodiment, processing logic selects one location from the one or more locations to move the software service based on the modelled latency and availability of the system.

Figure 4:
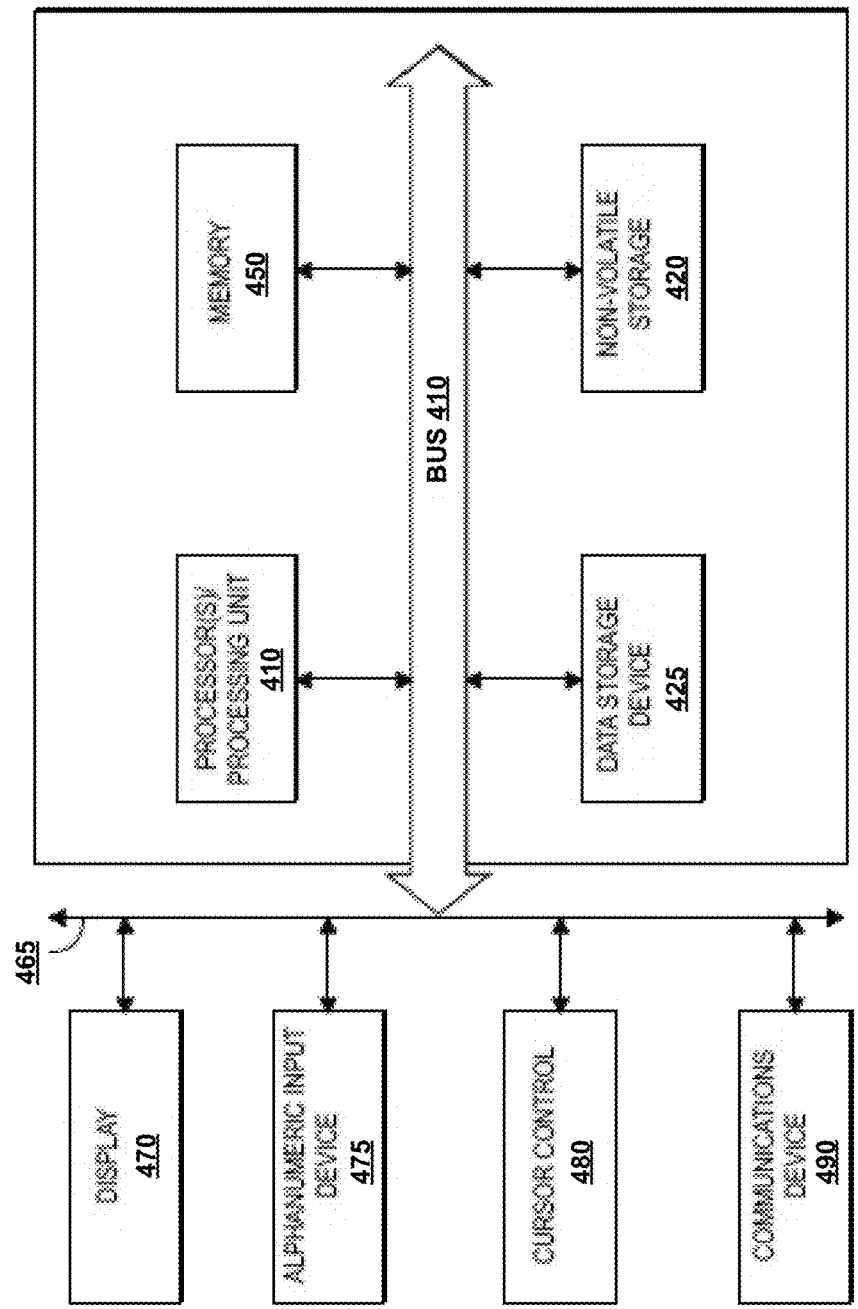
FIG. 4 is a block diagram of one embodiment of a computer system that may be used to support the systems and operations discussed herein.

FIG. 4 is one embodiment of a computer system that may be used to support the systems and operations discussed herein. It will be apparent to those of ordinary skill in the art, however, that other alternative systems of various system architectures may also be used.

The data processing system illustrated in FIG. 4 includes a bus or other internal communication means 515 for communicating information, and a processor(s) 410 coupled to the bus 415 for processing information. The system further comprises a random-access memory (RAM) or other volatile storage device 450 (referred to as memory), coupled to bus 415 for storing information and instructions to be executed by processor 410. Main memory 450 also may be used for storing temporary variables or other intermediate information during execution of instructions by processor(s) 410. The system also comprises a read only memory (ROM) and/or static storage device 420 coupled to bus 415 for storing static information and instructions for processor 510, and a data storage device 425 such as a magnetic disk or optical disk and its corresponding disk drive. Data storage device 425 is coupled to bus 415 for storing information and instructions.

The system may further be coupled to a display device 470, such as a light emitting diode (LED) display or a liquid crystal display (LCD) coupled to bus 415 through bus 565 for displaying information to a computer user. An alphanumeric input device 475, including alphanumeric and other keys, may also be coupled to bus 415 through bus 465 for communicating information and command selections to processor 410. An additional user input device is cursor control device 480, such as a touchpad, mouse, a trackball, stylus, or cursor direction keys coupled to bus 415 through bus 465 for communicating direction information and command selections to processor 410, and for controlling cursor movement on display device 570.

Another device, which may optionally be coupled to computer system 400, is a communication device 490 for accessing other nodes of a distributed system via a network. The communication device 490 may include any of a number of commercially available networking peripheral devices such as those used for coupling to an Ethernet, token ring, Internet, or wide area network. The communication device 490 may further be a null-modem connection, or any other mechanism that provides connectivity between the computer system 400 and the outside world. Note that any or all of the components of this system illustrated in FIG. 4 and associated hardware may be used in various embodiments as discussed herein.

In one embodiment, processor(s) 410 executes instructions to perform any of the operations described above including, but not limited to, determining one or more locations where the service is to be moved; for each of the one or more locations, computing a metric including a cross-cell cost (C-cost) or a data locality-cost (DL-cost) of the software service if a movement of the software service to a location was to occur, prior to performing the movement of the software service, modelling a latency and availability of the system due to the movement of the software service to the location based on the metric and performing the movement of the service based on the modelled latency and availability of the system.

It will be appreciated by those of ordinary skill in the art that any configuration of the system may be used for various purposes according to the particular implementation. The control logic or software implementing the described embodiments can be stored in main memory 450, mass storage device 425, or other storage medium locally or remotely accessible to processor 410.

It will be apparent to those of ordinary skill in the art that the system, method, and process described herein can be implemented as software stored in main memory 450 or read only memory 420 and executed by processor 410. This control logic or software may also be resident on an article of manufacture comprising a computer readable medium having computer readable program code embodied therein and being readable by the mass storage device 425 and for causing the processor 410 to operate in accordance with the methods and teachings herein.

The embodiments discussed herein may also be embodied in a handheld or portable device containing a subset of the computer hardware components described above. For example, the handheld device may be configured to contain only the bus 465, the processor 410, and memory 450 and/or 425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 410, a data storage device 425, a bus 415, and memory 450, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method for performing a movement of a service within a distributed system, the method comprising: determining one or more locations where the service is to be moved; for each of the one or more locations, computing a metric including a cross-cell cost (C-cost) or a data locality-cost (DL-cost) of the software service if a movement of the software service to a location was to occur, prior to performing the movement of the software service; and modelling a latency and availability of the system due to the movement of the software service to the location based on the metric; and performing the movement of the service based on the modelled latency and availability of the system.

Example 2 is the method of example 1 that may optionally include that, for each of the one or more locations, determining a cell to which the software service is to be pinned in a location.

Example 3 is the method of example 2 that may optionally include determining a cell boundary of the cell which the software service is to be pinned.

Example 4 is the method of example 3 that may optionally include that the C-cost or DL-cost of the service is increased when the cell boundary is crossed in a computation to perform one or more functions of the software service.

Example 5 is the method of example 4 that may optionally include that the modelling the latency and availability of the system comprises performing a latency injection to a computation to perform one or more functions of the software service when the cell boundary is crossed in the computation.

Example 6 is the method of example 5 that may optionally include that computing a total latency of the software service due to the movement of the software service to the location based on the C-cost or DL-cost and the latency injection.

Example 7 is the method of example 6 that may optionally include that the latency and availability of the system due to the movement of the software service to the location is modelled further based on the total latency of the software service.

Example 8 is the method of example 1 that may optionally include selecting one location from the one or more locations to move the software service based on the modelled latency and availability of the system.

Example 9 is one or more non-transitory computer readable storage media having instructions stored thereupon which, when executed by a system having at least a processor and a memory therein, cause the system to perform operations comprising: determining one or more locations where the service is to be moved; for each of the one or more locations, computing a metric including a cross-cell cost (C-cost) or a data locality-cost (DL-cost) of the software service if a movement of the software service to a location was to occur, prior to performing the movement of the software service; and modelling a latency and availability of the system due to the movement of the software service to the location based on the metric; and performing the movement of the service based on the modelled latency and availability of the system.

Example 10 is the computer readable storage media of example 9 that may optionally include that, the operations further comprise, for each of the one or more locations, determining a cell to which the software service is to be pinned in a location.

Example 11 is the computer readable storage media of example 10 that may optionally include that, the operations further comprise, determining a cell boundary of the cell which the software service is to be pinned.

Example 12 is the computer readable storage media of example 11 that may optionally include that the C-cost or DL-cost of the service is increased when the cell boundary is crossed in a computation to perform one or more functions of the software service.

Example 13 is the computer readable storage media of example 12 that may optionally include that, the operations further comprise, the modelling the latency and availability of the system comprises performing a latency injection to a computation to perform one or more functions of the software service when the cell boundary is crossed in the computation.

Example 14 is the computer readable storage media of example 13 that may optionally include that, the operations further comprise, computing a total latency of the software service due to the movement of the software service to the location based on the C-cost or DL-cost and the latency injection.

Example 15 is the computer readable storage media of example 14 that may optionally include that the latency and availability of the system due to the movement of the software service to the location is modelled further based on the total latency of the software service.

Example 16 is the computer readable storage media of example 9 that may optionally include that, the operations further comprise, selecting one location from the one or more locations to move the software service based on the modelled latency and availability of the system.

Example 17 is a system comprising: a memory to store instructions; and one or more processors coupled to the memory to execute the stored instructions to: determine one or more locations where the service is to be moved; for each of the one or more locations, compute a metric including a cross-cell cost (C-cost) or a data locality-cost (DL-cost) of the software service if a movement of the software service to a location was to occur, prior to performing the movement of the software service; and modelling a latency and availability of the system due to the movement of the software service to the location based on the metric; and perform the movement of the service based on the modelled latency and availability of the system.

Example 18 is the method of example 17 that may optionally include that the one or more processors are, for each of the one or more locations, to determine a cell to which the software service is to be pinned in a location.

Example 19 is the method of example 18 that may optionally include that the one or more processors are to determine a cell boundary of the cell which the software service is to be pinned.

Example 20 is the method of example 19 that may optionally include that the C-cost or DL-cost of the service is increased when the cell boundary is crossed in a computation to perform one or more functions of the software service.

Example 21 is the method of example 20 that may optionally include that the one or more processors are to perform a latency injection to a computation to perform one or more functions of the software service when the cell boundary is crossed in the computation.

Example 22 is the method of example 21 that may optionally include that the one or more processors are to compute a total latency of the software service due to the movement of the software service to the location based on the C-cost or DL-cost and the latency injection.

Example 23 is the method of example 22 that may optionally include that the latency and availability of the system due to the movement of the software service to the location is modelled further based on the total latency of the software service.

Example 24 is the method of example 17 that may optionally include that the one or more processors are to select one location from the one or more locations to move the software service based on the modelled latency and availability of the system.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method for performing a movement of a software service within a distributed system, the method comprising:
  determining one or more locations where the software service may potentially be moved;
  for each location of the one or more locations,
    prior to computing a metric for movement of the software service to said each location:
      estimating a cross-cell cost (C-cost) to indicate a number of times a cell boundary is crossed; and
      estimating a data locality cost (DL-cost) to indicate a number of times a boundary of a locality zone is crossed;
    computing the metric including the estimated C-cost or the estimated DL-cost of the software service if the movement of the software service to said each location was to occur, prior to performing the movement of the software service; and
    modelling latency and availability of the distributed system due to the movement of the software service to said each location based on the metric; and performing the movement of the software service based on the modelled latency and availability of the distributed system.

2. The method of claim 1, further comprising, for said each location of the one or more locations, determining a cell to which the software service is to be pinned if a move of the software service occurred.

3. The method of claim 2, further comprising determining the cell boundary of the cell to which the software service is to be pinned.

4. The method of claim 1, wherein the C-cost or the DL-cost of the software service is increased when the cell boundary is crossed when performing one or more functions of the software service.

5. The method of claim 1, wherein the modelling the latency and availability of the distributed system comprises performing a latency injection to a computation to perform one or more functions of the software service when the cell boundary is crossed in the computation.

6. The method of claim 5, further comprising computing a total latency of the software service due to the movement of the software service to the location based on the C-cost or the DL-cost and the latency injection.

7. The method of claim 6, further comprising modeling the latency and availability of the distributed system due to the movement of the software service to the location based on the total latency of the software service.

8. The method of claim 1, further comprising selecting one location from the one or more locations to move the software service based on the modelled latency and availability of the distributed system.

9. One or more non-transitory computer readable storage media having instructions stored thereupon which, when executed by a system having at least a processor and a memory therein, cause the system to perform operations comprising:
  determining one or more locations where a software service may potentially be moved;
  for each location of the one or more locations,
    prior to computing a metric for movement of the software service to said each location:
      estimating a cross-cell cost (C-cost) to indicate a number of times a cell boundary is crossed; and
      estimating a data locality cost (DL-cost) to indicate a number of times a boundary of a locality zone is crossed;
    computing the metric including the estimated C-cost or the estimated DL-cost of the software service if the movement of the software service to said each location was to occur, prior to performing the movement of the software service; and
    modelling latency and availability of a distributed system due to the movement of the software service to said each location based on the metric; and
  performing the movement of the software service based on the modelled latency and availability of the distributed system.

10. The one or more non-transitory computer readable storage media of claim 9, wherein the operations further comprise, for said each location of the one or more locations, determining a cell to which the software service is to be pinned if a move of the software service occurred.

11. The one or more non-transitory computer readable storage media of claim 10, wherein the operations further comprise, determining the cell boundary of the cell to which the software service is to be pinned.

12. The one or more non-transitory computer readable storage media of claim 9, wherein the C-cost or the DL-cost of the software service is increased when the cell boundary is crossed when performing one or more functions of the software service.

13. The one or more non-transitory computer readable storage media of claim 9, wherein the modelling the latency and availability of the distributed system comprises performing a latency injection to a computation to perform one or more functions of the software service when the cell boundary is crossed in the computation.

14. The one or more non-transitory computer readable storage media of claim 13, wherein the operations further comprise, computing a total latency of the software service due to the movement of the software service to the location based on the C-cost or the DL-cost and the latency injection.

15. The one or more non-transitory computer readable storage media of claim 14, wherein the operations further comprise modeling the latency and availability of the distributed system due to the movement of the software service to the location based on the total latency of the software service.

16. The one or more non-transitory computer readable storage media of claim 9, wherein the operations further comprise, selecting one location from the one or more locations to move the software service based on the modelled latency and availability of the distributed system.

17. A system comprising:
  a memory to store instructions; and
  one or more processors coupled to the memory to execute the stored instructions to:
    determine one or more locations where a software service may potentially be moved;
    for each location of the one or more locations,
      prior to computing a metric for movement of the software service to said each location:
        estimate a cross-cell cost (C-cost) to indicate a number of times a cell boundary is crossed; and
        estimate a data locality cost (DL-cost) to indicate a number of times a boundary of a locality zone is crossed;
      compute the metric including the estimated C-cost or the estimated DL-cost of the software service if the movement of the software service to said each location was to occur, prior to performing the movement of the software service; and
      model latency and availability of a distributed system due to the movement of the software service to said each location based on the metric; and
    perform the movement of the software service based on the modelled latency and availability of the distributed system.

18. The system of claim 17, wherein the one or more processors are further to, for said each location of the one or more locations, determine a cell to which the software service is to be pinned if a move of the software service occurred.

19. The system of claim 18, wherein the one or more processors are further to determine the cell boundary of the cell to which the software service is to be pinned.

20. The system of claim 17, wherein the C-cost or the DL-cost of the software service is increased when the cell boundary is crossed in when performing one or more functions of the software service.

21. The system of claim 17, wherein the one or more processors are further configured to perform a latency injection to a computation to perform one or more functions of the software service when the cell boundary is crossed in the computation.

22. The system of claim 21, wherein the one or more processors are further configured to compute a total latency of the software service due to the movement of the software service to the location based on the C-cost or the DL-cost and the latency injection.

23. The system of claim 22, wherein the one or more processors are further configured to model the latency and availability of the distributed system due to the movement of the software service to the location based on the total latency of the software service.

24. The system of claim 17, wherein the one or more processors are further configured to select one location from the one or more locations to move the software service based on the modelled latency and availability of the distibuted system.

* * * * *